US005984488A

United States Patent [19]

Tung

[11] Patent Number: 5,984,488

[45] Date of Patent: Nov. 16, 1999

[54] ILLUMINATE WARNING VEST WITH PHOTO DIODE AFFIXING STRUCTURE

[76] Inventor: Jung Fang Tung, No. 9, Lane 39, N. Hou-Sing Road, Kaoshiung, Taiwan

[21] Appl. No.: 09/106,557

[22] Filed: Jun. 29, 1998

[51] Int. Cl.$^{6}$ .................... C12F 17/20

[52] U.S. Cl. .................... 362/108; 362/800

[58] Field of Search .................... 362/108, 103, 362/800, 226, 249

[56] References Cited

U.S. PATENT DOCUMENTS

| | | | |
|---|---|---|---|
| 4,599,682 | 7/1986 | Stephens | 362/103 |
| 4,823,240 | 4/1989 | Shenker | 362/103 |
| 4,839,777 | 6/1989 | Janko et al. | 362/108 |
| 4,924,362 | 5/1990 | Janko et al. | 362/108 |
| 5,068,771 | 11/1991 | Savage, Jr. | 362/225 |
| 5,440,461 | 8/1995 | Nadel et al. | 362/103 |
| 5,440,468 | 8/1995 | Savage, Jr. | 362/226 |
| 5,779,348 | 7/1998 | Interlicchio | 362/103 X |
| 5,848,839 | 12/1998 | Savage, Jr. | 362/267 |

*Primary Examiner*—Laura K. Tso
*Attorney, Agent, or Firm*—Raymond Y. Chan; David and Raymond

[57] ABSTRACT

An illuminate warning vest with photo diode affixing structure includes a circuitry main board, a photo diode welded on the circuitry main board, and a protective case engaged on the circuitry main board, wherein the circuitry main board having a plurality of welding holes for the photo diode to weld therein and a plurality of affixing holes surrounded the welding holes for the protective case to engage therein. The protective case having a central opening for allowing the light generated from the photo diode to spread out therefrom and comprises a plurality of affixing clips protruded downwardly from an outer rim of the protective case. Flach of the affixing clips has a clip end portion in a wedge shape for engaging into the affixing holes of the circuitry main board respectively, so that the protective case is affixed in place. The illuminate warning vest is especially designed to bring instant attention from other drivers on the road even from far away.

2 Claims, 4 Drawing Sheets

ILLUMINATE WARNING VEST WITH PHOTO DIODE AFFIXING STRUCTURE

FIELD OF THE PRESENT INVENTION

The present invention relates to an illuminate warning vest with photo diode affixing structure, and more particularly to an illuminate warning vest that has a photo diode affixing structure which can safely secure the photo diode on the illuminate warning vest, so that the illuminate warning vest can be wore to make oneself noticeable to others either during a vehicle break down, or for the construction worker on the road.

BACKGROUND OF THE PRESENT INVENTION

Normally when a vehicle breaks down or has trouble on the road, the driver often try to alert the oncoming traffic to avoid accident by placing a light reflecting triangular warning sign, a warning cone, or a smoke flare behind the troubled vehicle. However, no device is yet designed to alert other drivers where the position of the driver of the troubled vehicle is. During night time, the night vision is often considerably poor. The driver of the break down vehicle would need to step out of the vehicle to place the warning device or walk in to the emergency phone, but since the driver is not easily noticeable, many unfortunate accidents happened during such process each year.

The road construction workers currently have special vest to help themselves being noticeable. The vest that they wore is made of bright color such as yellow or orange, and has many strips of light reflector sewed thereon. Most of the road constructions take place during night hour, because that is the time that has the lightest traffic. However, during night time, the vest that the road construction workers wore can not necessary bring instant attention from other drivers on the road from distances. If the drivers on the road can not see the road construction workers with enough reacting time, the life of the construction workers might be in serious danger, in other word, to bring instant attention to the drivers on the road from distances can avoid many accidents and definitely save life.

SUMMARY OF THE PRESENT INVENTION

The main objective of the present invention is to provide an illuminate warning vest with photo diode affixing structure which not only provides a light reflecting layer, but also comprises a plurality of build-in self flashing illuminating units to alert the oncoming traffic in high visibility during either day time or night time to fully provide warning and bring instant attention to other drivers on the road even from far away.

Another objective of the present invention is to provide an illuminate warning vest which is designed for the road construction workers to be highly visible and that can bring instant attention from other drivers on the road from far away.

Still another objective of the present invention is to provide an illuminate warning vest which provides an independent water sealed portion as a protective layer so that in case a defect or damage to a transparent water resistant layer, the water can not enter the illuminate warning vest to affect the proper function of the photo diode.

According to the present invention, an illuminate warning vest comprises an inner layer, a light reflecting layer, a transparent water resistant layer, a circuitry main board, a photo diode welded on the circuitry main board, and a protective case is engaged on the circuitry main board for protecting the photo diode, wherein the light reflecting layer has provided a plurality of through holes at a predetermined location, the circuitry main board is positioned between the light reflecting layer and the inner layer, two end portions of the circuitry main board have provided a plurality of symmetrical wire holes for allowing a wire to pass therethrough and electrically weld on an electrical conducting region of the circuitry main board.

The protective case has a center opening and comprises a plurality of affixing clips extended downwardly from a rim portion of the protective case. The affixing clips each has a clip end portion in a wedge shape. The circuitry main board further provided a plurality of welding holes at a center portion for allowing a terminal end of the photo diode to insert therein and weld on the electrical conducting region of the circuitry main board, and a plurality of affixing holes surrounding the plurality of welding holes for the clip end portion of the affixing clips of the protective case to engage therein.

The protective case is connected to the circuitry main board by engaging the clip end portion of the affixing clip within the affixing holes of the circuitry main board through at least a flange and the through hole of the light reflecting layer, so that the flange and the circuitry main board affixed the light reflecting layer therebetween; the protective case is safely covered the photo diode, in fact, a rim portion of the center opening of the protective case is pressed against a top portion of the photo diode, so that the photo diode is affixed in position and that the light spread out from the photo diode can be detected through the center opening and the transparent water resistant layer.

DETAILED DESCRIPTION OF THE PREFERRED EMBODIMENT

Figure 1:
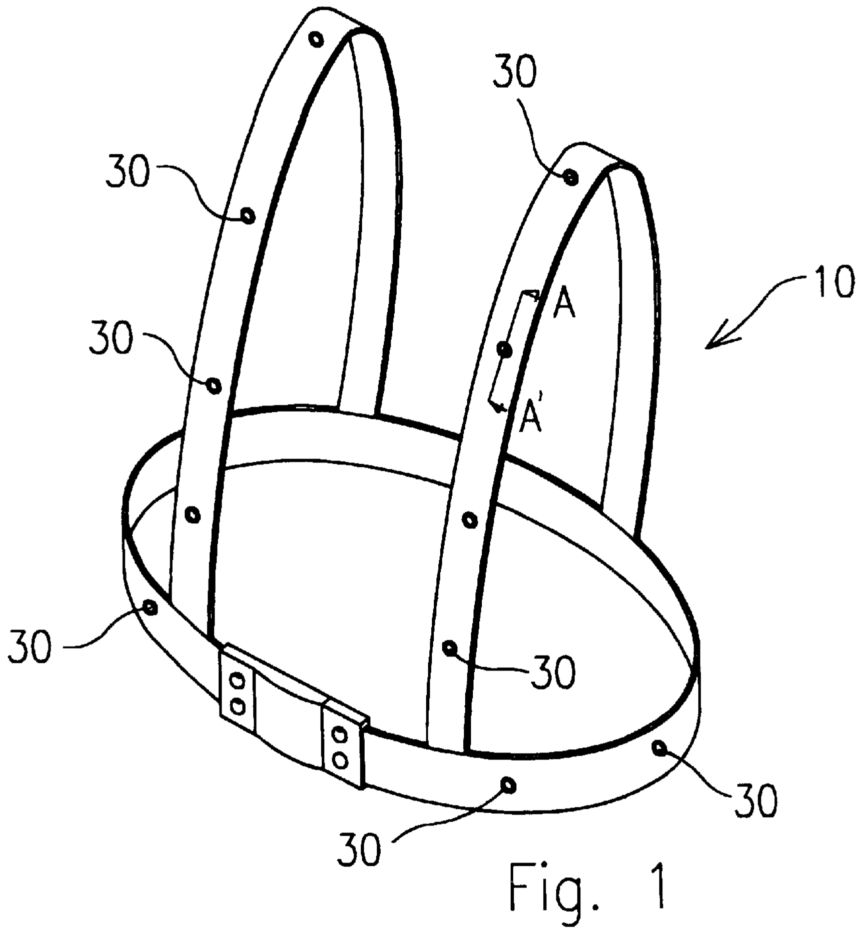
FIG. 1 is a perspective view of an illuminate warning vest with photo diode affixing structure according to a first preferred embodiment of the present invention.
Figure 2:
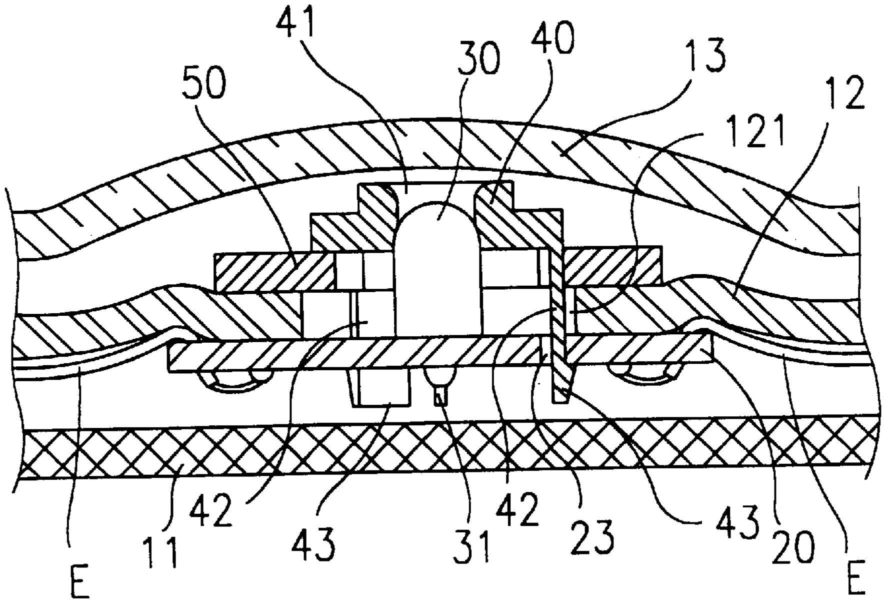
FIG. 2 is a section end view along section line A–A' of FIG. 1 of the illuminate warning vest with photo diode affixing structure according to the above first preferred embodiment of the present invention.

Referring to FIGS. 1 to 4 of the drawings, an illuminate warning vest with photo diode affixing structure according to a first preferred embodiment of the present invention is illustrated. The illuminate warning vest 10 comprises an inner layer 11, a light reflecting layer 12, and a transparent water resistant layer 13, wherein the light reflecting layer 12 provided a plurality of through holes 121 at a predetermined location.

The illuminate warning vest 10 further comprises a circuitry main board 20, a photo diode 30 welded on the circuitry main board 20, and a protective case 40 engaged on the circuitry main board 20 for protecting the photo diode 30, wherein the circuitry main board 20 is positioned between the light reflecting layer 12 and the inner layer 11, two end portions of the circuitry main board 20 provided a plurality of symmetrical wire holes 21 for allowing a wire E to pass therethrough and electrically weld on an electrical conducting region 201 of the circuitry main board 20.

The protective case 40 has a center opening 41 and comprises a plurality of affixing clips 42 extended downwardly from a rim portion of the protective case 40. The affixing clips 42 each has a clip end portion 43 in a wedge shape. The circuitry main board 20 further provided a plurality of welding holes 22 at a center portion for allowing a terminal end 31 of the photo diode 30 to insert therein and weld on the electrical conducting region 201 of the circuitry main board 20, and a plurality of affixing holes 23 surrounding the plurality of welding holes 22 for the clip end portion 43 of the affixing clips 42 of the protective case 40 to engage therein.

Figure 3A:
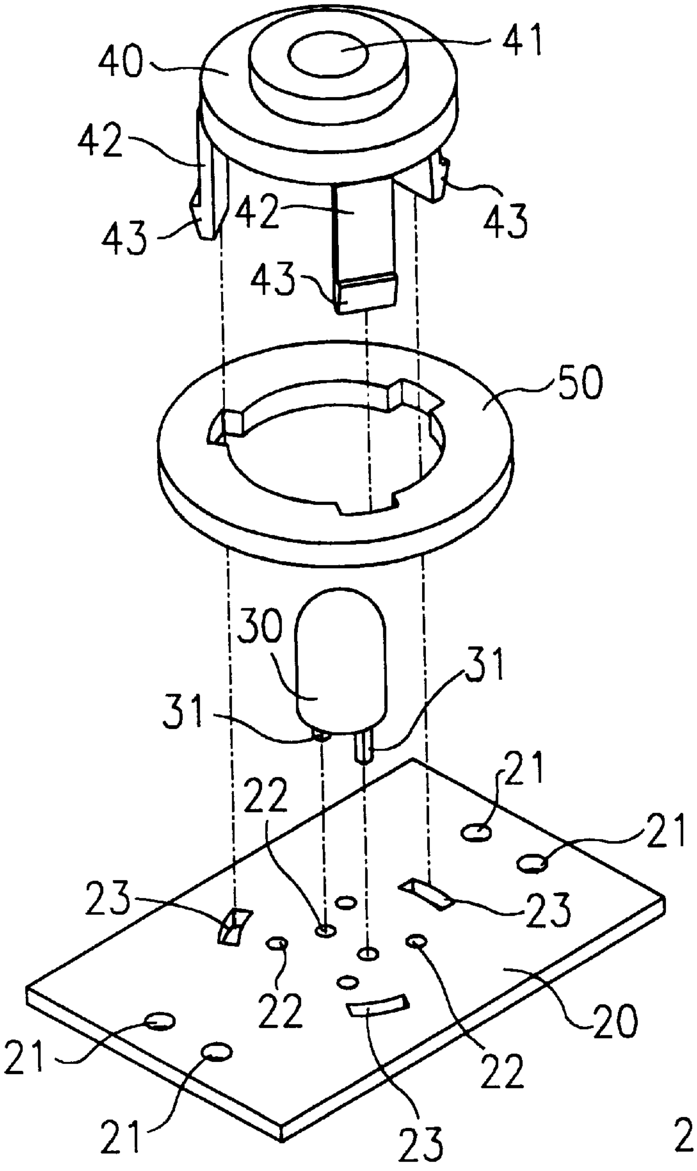
FIG. 3A is an exploded view of the illuminate warning vest with photo diode affixing structure according to the above first preferred embodiment of the present invention.
Figure 3B:
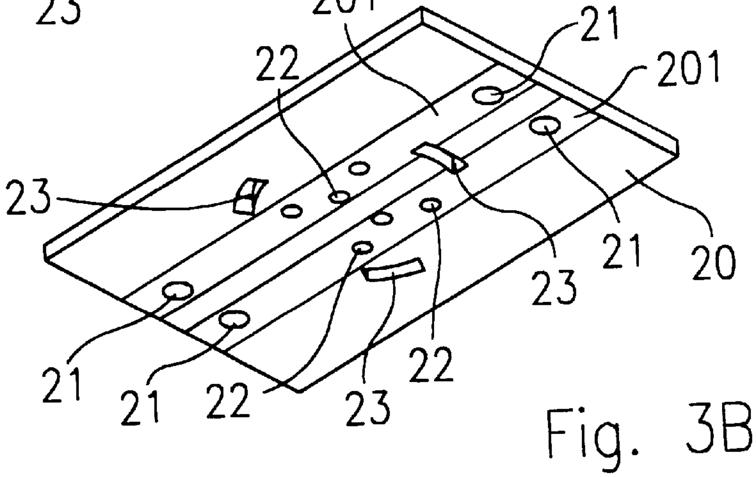
FIG. 3B is a rear view of a circuitry main board according to the above first preferred embodiment of the present invention.
Figure 4:
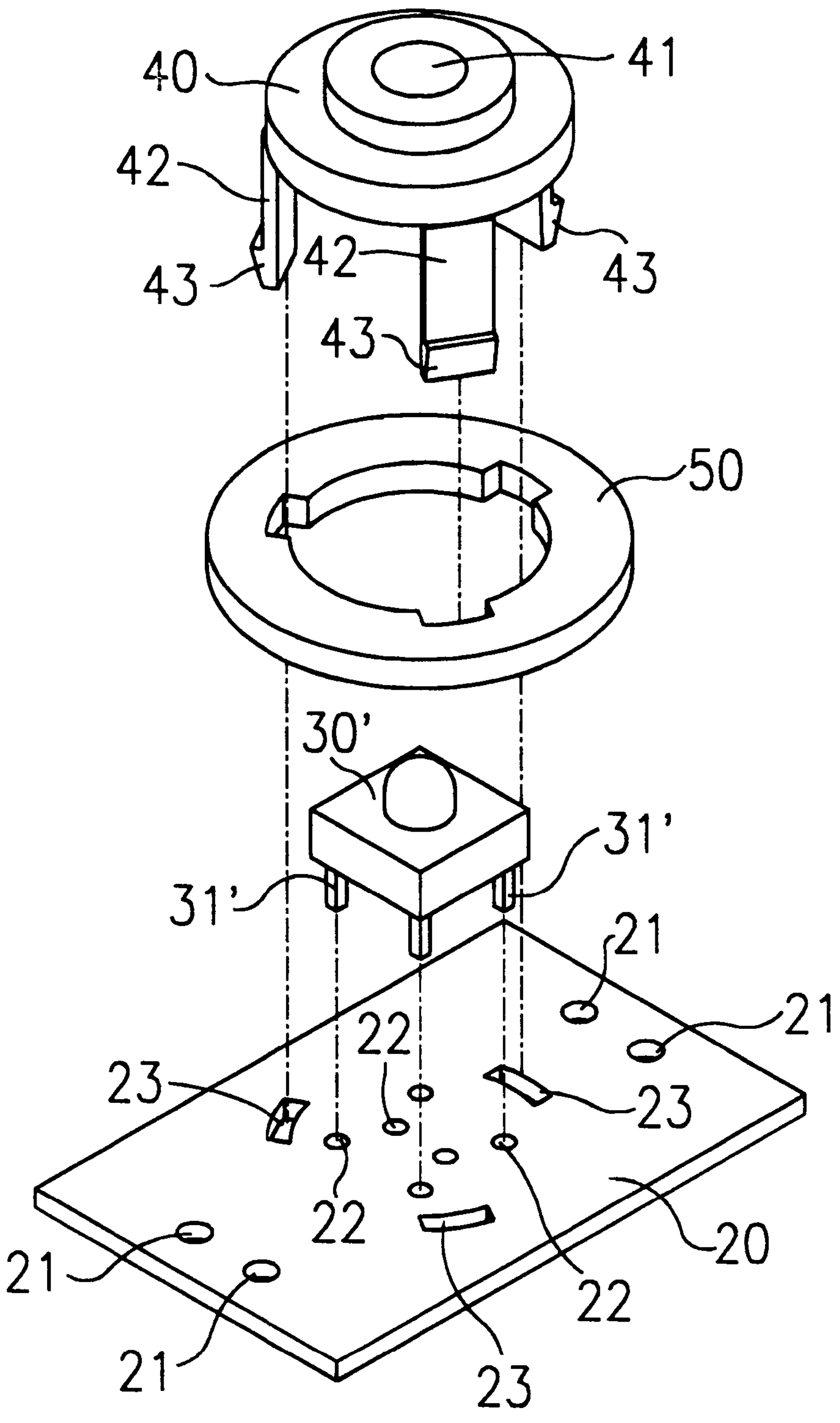
FIG. 4 is a perspective view of the illuminate warning vest with photo diode affixing structure according to the above first preferred embodiment of the present invention, wherein the photo diode has four terminal ends.

The protective case 40 is connected to the circuitry main board 20 by engaging the clip end portion 43 of the affixing clip 42 within the affixing holes 23 of the circuitry main board 20 through at least a flange 50 and the through hole 121 of the light reflecting layer 12, so that the flange 50 and the circuitry main board 20 affixed the light reflecting layer 12 therebetween. The protective case 40 is safely covered the photo diode 30, in fact, a rim portion of the center opening 41 of the protective case 40 is pressed against a top portion of the photo diode 30, so that the photo diode 30 is affixed in position and that the light spread out from the photo diode 30 can be detected through the center opening 41 and the transparent water resistant layer 13. The above describe photo diode 30 comprises of two terminal ends 31 as shown in FIG. 3A. The photo diode 30', as shown in FIG. 4, has four terminal ends 31'.

Figure 5:
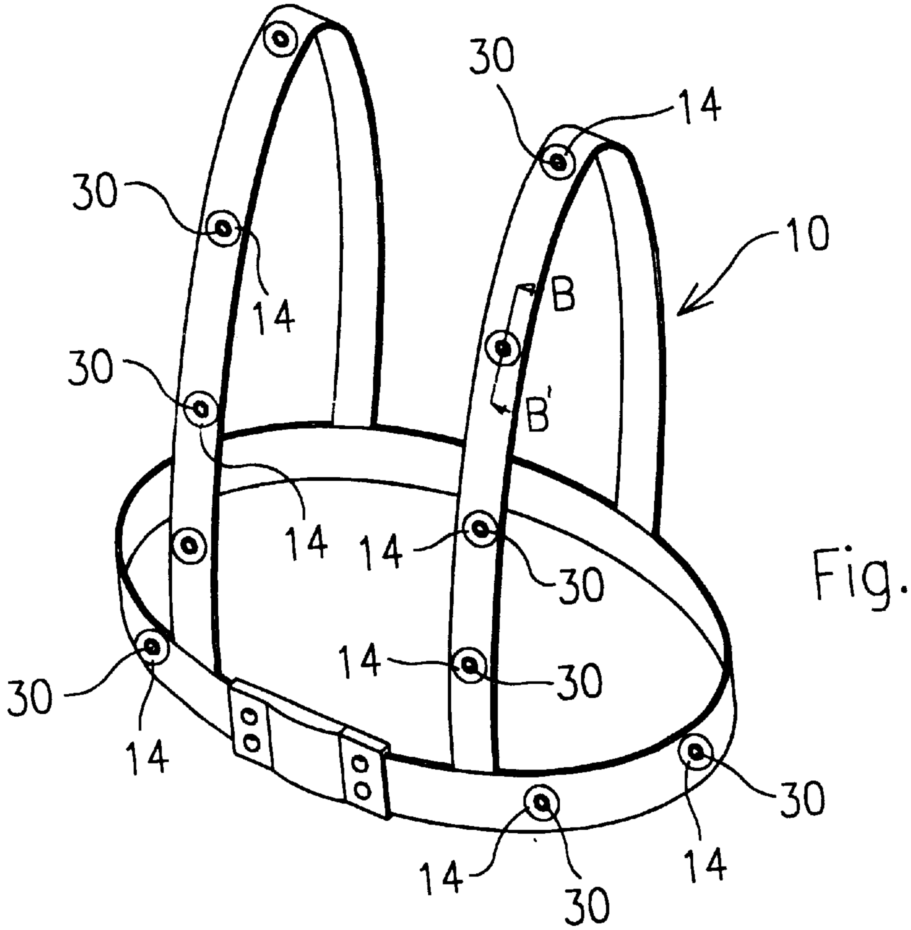
FIG. 5 is a perspective view of the illuminate warning vest with photo diode affixing structure according to a second preferred embodiment of the present invention.
Figure 6:
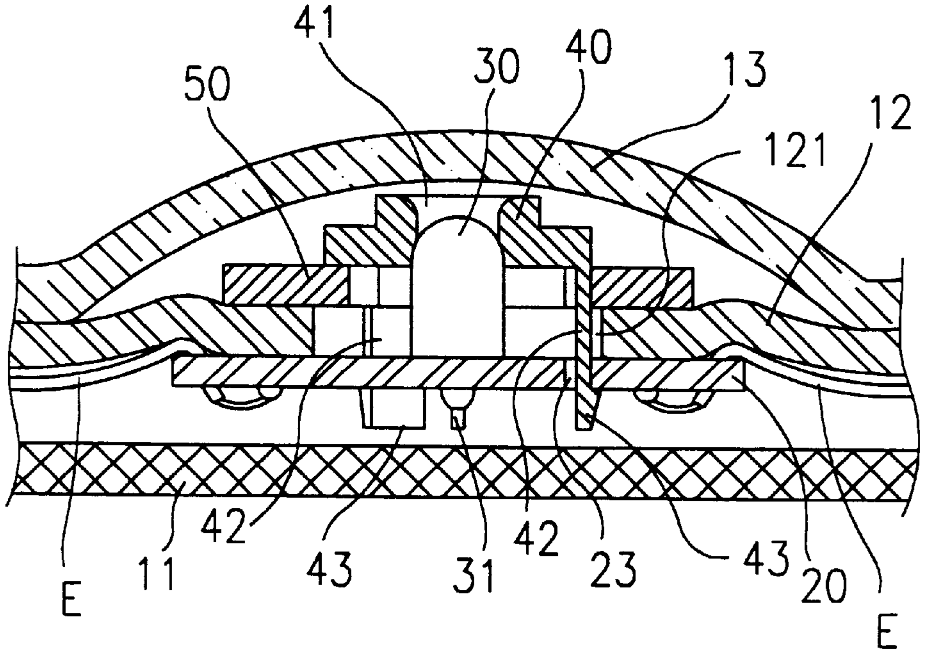
FIG. 6 is a section end view along section line B–B' of FIG. 5 of the illuminate warning vest with photo diode affixing structure according to the above second preferred embodiment of the present invention.

Referring to FIGS. 5 and 6 of the drawing, the illuminate warning vest with photo diode affixing structure according to a second preferred embodiment of the present invention is illustrated. The illuminate warning vest 10 further comprises an independent water sealed portion 14 on an outer portion of the light reflecting layer 12 where each photo diode 30 is located. The independent water sealed portion 14 is formed by gluing in high frequency of the transparent water resistant layer 13 on the surrounding edge of the light reflecting layer 12 around each photo diodes 30. The independent water sealed portion 14 is a protective layer so that in case a defect or damage occur to the transparent water resistant layer 13, the water can not enter the illuminate warning vest 10 to affect the proper function of the photo diode 30.

I claim:

1. An illuminate warning vest, comprising an inner layer, a light reflecting layer, a transparent water resistant layer, a circuitry main board, a photo diode welded on said circuitry main board, and a protective case is engaged on said circuitry main board for protecting said photo diode, wherein said light reflecting layer provided a plurality of through holes at a predetermined location, said circuitry main board is positioned between said light reflecting layer and said inner layer, two end portions of said circuitry main board provided a plurality of symmetrical wire holes for allowing a wire to pass therethrough and electrically weld on an electrical conducting region of said circuitry main board;

said protective case has a center opening and comprises a plurality of affixing clips extended downwardly from a rim portion of said protective case; said affixing clips each has a clip end portion in a wedge shape; said circuitry main board further provided a plurality of welding holes at a center portion for allowing a terminal end of said photo diode to insert therein and weld on said electrical conducting region of said circuitry main board, and a plurality of affixing holes surrounding said plurality of welding holes for said clip end portion of the affixing clips of the protective case to engage therein;

said protective case is connected to said circuitry main board by engaging said clip end portion of said affixing clip within said affixing holes of said circuitry main board through at least a flange and said through hole of said light reflecting layer, so that said flange and said circuitry main board affixed said light reflecting layer therebetween; said protective case is safely covered said photo diode, in fact, a rim portion of said center opening of said protective case is pressed against a top portion of said photo diode, so that said photo diode is affixed in position and that said light spread out from said photo diode can be detected through said center opening and said transparent water resistant layer.

2. An illuminate warning vest, as recited in claim 1, wherein said illuminate warning vest further comprises an independent water sealed portion on an outer portion of said light reflecting layer where each photo diode is located; said independent water sealed portion is formed by gluing in high frequency of said transparent water resistant layer on said surrounding edge of said light reflecting layer around each photo diode.

* * * * *